United States Patent

Wynne et al.

[11] Patent Number: 5,328,743
[45] Date of Patent: Jul. 12, 1994

[54] REINFORCED SHRINK WRAP

[75] Inventors: Lyndell K. Wynne, Kingwood; Dennis J. Olheiser, Missouri City, both of Tex.

[73] Assignee: Reef Industries, Inc., Houston, Tex.

[21] Appl. No.: 933,407

[22] Filed: Aug. 21, 1992

[51] Int. Cl.⁵ .............................................. B32B 5/12
[52] U.S. Cl. .................................. 428/105; 428/34.9; 428/109; 428/110; 428/113; 428/247; 428/255; 428/215; 428/216; 428/515; 428/516; 428/475.8; 428/474.4; 428/474.7; 428/474.9; 206/497
[58] Field of Search ............... 428/109, 110, 113, 105, 428/247, 255, 500, 215, 216, 913, 515, 476.1, 475.8, 474.4, 474.7, 474.9, 34.9, 343, 516; 206/497

[56] References Cited

U.S. PATENT DOCUMENTS

| | | | |
|---|---|---|---|
| 4,592,941 | 6/1992 | Emmons | 428/113 |
| 4,952,438 | 8/1990 | Kipfelsberger | 428/68 |

OTHER PUBLICATIONS

Cryovac ® D-925 Film.

*Primary Examiner*—Ellis P. Robinson
*Assistant Examiner*—Nasser Ahmad
*Attorney, Agent, or Firm*—Vaden, Eickenroht, Thompson, Boulware & Feather

[57] ABSTRACT

A reinforced shrink wrap has been developed for use in all types of environments and products or applications. The shrink wrap is tear resistant and can be prepared to withstand exposure from the sun and corrosive elements. The wrap is multilayered with reinforcing filamentous grids in adhesive layers on either side of a shrink film with outer layers of olefin film.

23 Claims, 2 Drawing Sheets

REINFORCED SHRINK WRAP

BACKGROUND AND SUMMARY OF THE INVENTION

Shrink wrap is used for a multitude of applications from wrapping produce in supermarkets to covering containers and products for shipping. For the purpose of this description product and container are used interchangeably as examples of the use of the invention. The shrink wrap film will deform with the application of heat to surround snugly the product or product container to be protected. However, shrink wrap is subject to tears, rips and punctures and has no more strength than the film itself.

Reinforced plastic films have been developed that are durable, strong and resist punctures and tearing. An example is U.S. Pat. No. 4,592,941 assigned to the applicant which is incorporated by reference herein as part of the specification of this application. The reinforced plastic film is used to make bags for heavy products, storage and outdoor coverings as described in its specification. However, it does not deform in a shrink wrap manner upon exposure to heat to snugly fit to cover the product or container.

The present invention is a reinforced shrink wrap that can be made to cover all sizes of products and containers and is especially suited for covers for large equipment. The reinforced shrink wrap is multilayered and includes a reinforcing grid with the shrink layer. The reinforced shrink wrap is superior to the conventional non-reinforced product for packaging, handling, shipping and storage of goods. The reinforcing grid minimizes and contains tears, rips and prevents punctures from spreading. Yet, the multilayered reinforced shrink wrap deforms to fit the product or container in the same or similar manner as the conventional shrink wrap.

The multilayered shrink wrap has at least one layer of shrink film of highly irradiated polyethylene. On either side of the shrink film is reinforcing filamentous grid in a flexible adhesive layer. On the outer surfaces of the multilayer reinforced shrink wrap are two layers of polyolefin film. The reinforced shrink wrap may have more than one inner layer of shrink film with additional facing layers of the filamentous reinforcing grid in the adhesive layer. Also, inner layers of polyolefin film may be added with the reinforcing grid and adhesive layers facing either side of the inner polyolefin layer. The polyolefin layers may be a multiply film.

Additives used in polyolefin film may be included as desired in the polyolefin inner or outer layers or in one of more plies of a multiply film. Additives include ultraviolet light stabilizers, flame retardants, static inhibitors, antioxidants, color additives, corrosion inhibitors, biocides and compatible mixtures of the additives as desired.

The reinforced shrink wrap is resistant to localized heat burn through during the heating step used to shrink the wrap around the product. The use of the reinforced shrink wrap is particularly suited for protecting cargo and equipment exposed to harsh environments.

DETAILED DESCRIPTION OF THE INVENTION

Figure 1:
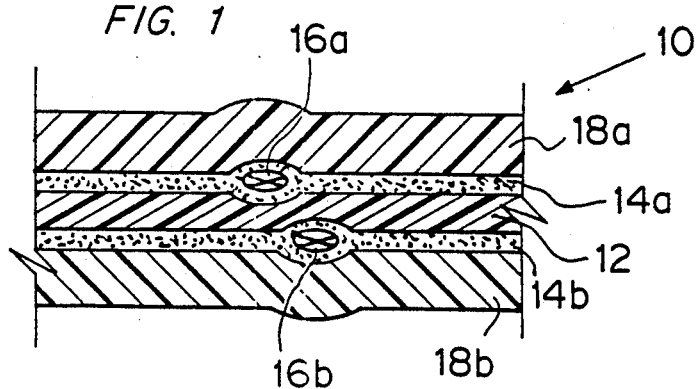
FIG. 1 is an enlarged cross-section view of one embodiment of the multilayer reinforced shrink wrap.

The reinforced shrink wrap can be customized for the intended use. As will be understood from the following description, the various layers can be formulated as to thickness and additives as needed. For instance, for applications with large equipment to be shipped on a vessel overseas where there will be exposure to salt spray and other elements, a thicker shrink wrap with a corrosion inhibitor would be preferred. If exposure to the sun for a period of time is expected an ultraviolet light stabilizer would be desired. Many variations of the invention will be understood by those skilled in the art.

The shrink film layer is highly irradiated polyethylene and can be linear low density polyethylene, low density polyethylene or mixtures thereof. The preferred thickness is from 0.75 mil to 1.5 mils and can be varied based on the intended use and desired strength of the final multilayered product.

The reinforcing grid is preferably 200 to 800 denier yarn in a crisscross pattern. The grid is filamentous made of single strand or multiple filament yarn preferably of nylon, polyester or blends. The reinforcing grid is in a layer of water-based or solvent-based adhesive or other pressure sensitive adhesives. The dry thickness of the adhesive is between 0.25 and 1 mil with a preferred dry thickness of about 0.75 mil. The adhesive should be used in an effective amount to prevent delamination. However, the amount of adhesive should not be an excessive amount that retards the movement of the grid under stress such as a puncture. The grid should sag to prevent further tearing. The reinforcing grid in the adhesive layer is in between the layers of shrink film and the outer layer of polyolefin film and inner layers of polyolefin, if any, to provide the tear, puncture and rip resistance and adhesion to make a strong multilayer film. The reinforcing grid is preferably spaced about 0.5 inches apart and can be any spacing desired, but is generally from ⅛ inch to a two inch grid.

The outer layer of the shrink wrap is a polyolefin film from 1 to 6 mils thick. Additional layers of polyolefin may be used as inner layers disposed between adhesive with or without reinforcing grids. The polyolefin can be any type or blends and the thickness depends on the application and desired thickness of the end product.

The polyolefin layer may have two plies or more. The polyolefin used can be any one of the known and used thermoplastics such as low and high density polyethylene including linear low density polyethylene and polypropylene. Also, ethylene-propylene-diene can be included in a blend in the polyolefin layer. When the polyolefin layer contains more than one ply, each ply can be made of a different polyolefin or mixtures thereof. For instance the ply that will be the outer facing surface of the shrink wrap can be low density polyethylene which is amenable to heat sealing and is suitable for fabricating the product covers and also has a good surface appearance. The other ply or plies can be another polyolefin or mixtures. The multiply film can be prepared in methods known to those skilled in the art such as co-extruded blown film manufacturing techniques.

For the various layers with an adhesive and filamentous grid the following manufacturing method can be employed. The layers are coated on one side with the adhesive. The reinforcing filamentous grid is laid on one layer of adhesive coated film so that the grid covers substantially the entire area. The grid can be formed by laying filaments in a crisscross pattern to either side of the machine axis. Then the two layers are bonded together on the adhesive coated sides with the grid in between and rolled under pressure. The process is repeated to provide additional reinforcing layers as desired.

The polyolefin layers can include additives for color and may have a printed message on any layer, if desired. Other additives that can be used include ultraviolet light stabilizers, antioxidants and corrosion inhibitors. Also, static inhibitors, flame retardants and biocides compatible with polyolefins may be incorporated in or coated on the film layer. The various additives may be combined and included in one polyolefin layer or different additives or combinations thereof may be included in more than one polyolefin layer. In the shrink wrap with the multiply polyolefin layers additives or combinations, thereof may be included in one or more of the plies.

EXAMPLE 1

FIG. 1 is the cross section of a multilayer reinforced shrink wrap 10 of this invention. The reinforced shrink wrap 10 is shown to illustrate an embodiment of the invention and the various layers. The center layer 12 in FIG. 1 is the highly irradiated polyethylene shrink film layer. In a preferred embodiment the shrink film is 0.75 mil thick. A preferred shrink film is Cryovac ® D-925 Film. The preferred shrink layer is highly cross linked from an irradiation process and has the following specifications in TABLE 1.

TABLE 1

| PROPERTY | ASTM TEST METHOD | TYPICAL VALUE | |
|---|---|---|---|
| Minimum Use Temp | | 60° F. | |
| Maximum Storage Temp (two years maximum) | | 90° F. | |
| Shrink Temp Air | | 275°–350° F. | |
| Density | D-1505 | 0.936 | |
| Haze % | D-1003 | 3.0 | |
| Gloss % | D-2457 | 90.4 | |
| Ball Burst Impact Strength | D-3420 | 7.1 cm/kg | |
| Coefficient of Friction Film to Film, Kinetic | D-1894 | .24 | |
| Water Vapor Transmission Rate | F-372 | 0.85 gms/100 sq. in/24 hrs. | |
| Oxygen Transmission Rate | D-1434 | 4,590 cc/sq. M./24 hrs. | |
| | | LD* | TD** |
| Tensile Strength | D-882 | 12,200 psi | 11,700 psi |
| Elongation at Break | D-882 | 95% | 86% |
| Modulus of Elasticity | D-882 Method A | 127,000 psi @ 73° F. | 128,000 psi @ 73° F. |
| Tear Propagation | D-1938 | 5.7 grams | 6.3 grams |
| Unrestrained Shrink | D-2732 | | |
| 200° F. | | 10% | 11% |
| 220° F. | | 16% | 26% |
| 240° F. | | 29% | 43% |

TABLE 1-continued

| PROPERTY | ASTM TEST METHOD | TYPICAL VALUE | |
|---|---|---|---|
| 260° F. | | 80% | 78% |

*Longitudinal Direction
**Transverse Direction

The layers on either side of shrink film layer 10 are adhesive layers 14a and 14b that are preferably an acrylic based adhesive in a aqueous carrier about 0.75 mil thick when dry. A cross section of the reinforcing filamentous grids 16a and 16b are shown in the flexible adhesive layers 14a and 14b. The preferred grid is a multifilament nylon yarn in a nonwoven grid laid out in a diamond crisscross pattern. The outer layers 18a and 18b are polyolefin film generally from 1 to 6 mils in thickness. In one of the preferred embodiments one of the outer polyolefin layers includes an ultraviolet light stabilizer as an additive in a mixture of low density polyethylene and linear low density polyethylene and the layer is 2.00 mil thick. A commercially available ultraviolet stabilizer is Chimassorb 944 ® by Ciba-Geigy from a family of hindered amines. The stabilizer is prepared in a concentrated form in polyethylene and is blended with polyolefin prior to preparing the film. The other outer polyolefin layer has an anticorrosive additive in linear low density polyethylene and is 2.00 mil thick. A preferred corrosion inhibitor is anti-corrosive additive PA4733 manufactured by Northern Instruments Corporation.

The following TABLE 2 includes the properties of a reinforced shrink wrap of Example 1 with the ASTM test used to define the property and typical variance where applicable.

TABLE 2

| PROPERTY | ASTM | UNITS | VALUE | VARIANCE |
|---|---|---|---|---|
| Thickness (Between Fibers) | D-2103 | mils | 6.4 | 0.4 |
| Thickness (At Intersection) | D-2103 | mils | 10.9 | 0.7 |
| Std Wt | D-2103 | lb/msf | 32.6 | 0.1 |
| 3" Tensile -MD | D-882 | lbf | 89.5 | 5.3 |
| 3" Tensile -TD | D-882 | lbf | 85.9 | 13.7 |
| 3" Elongation -MD | D-882 | % | 485.5 | 207.6 |
| 3" Elongation -TD | D-882 | % | 508.5 | 259.7 |
| 1" Peel | D-882 | lbf | 14.6 | 4.2 |
| Tongue Tear -MD | D-1938 | lbf | 10.5 | 1.5 |
| Tongue Tear -TD | D-1938 | lbf | 11.03 | 2.0 |
| PPT Tear -MD | D-2582 | lbf | 18.2 | 1.0 |
| PPT Tear -TD | D-2582 | lbf | 19.9 | 1.4 |
| Shrinkage -MD | D-1204 | % | 4.5 | 0.4 |
| Shrinkage -TD | D-1204 | % | 4.8 | 1.5 |
| Shrinkage -AREA | D-1204 | % | 9.0 | 1.3 |
| Drop Dart | D-1709 | g | 2024.0 | 40.0 |
| Cold Crack | D-1709 | Deg F.° | −60.0 | 0.0 |

MD - Machine Direction
TD - Transverse Direction

EXAMPLE 2

Figure 2:
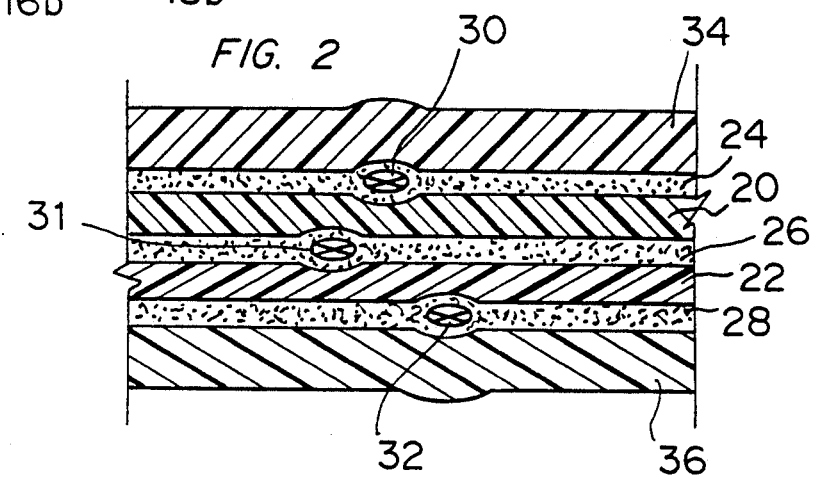
FIG. 2 is an enlarged cross-section view of an alternative embodiment of the multilayer reinforced shrink wrap.

The cross section of another embodiment of the multilayered reinforced shrink wrap is shown in FIG. 2. Certain layers can be added and varied as described herein. Layers 20 and 22 can both be shrink film or one of layers 20 and 22 can be shrink film and the other a polyolefin film layer. The shrink film and polyolefin layers are prepared as described in Example 1 and the specification generally above.

Layers 24, 26, and 28 are adhesive layers and cross sections of the filamentous grid 30, 31 and 32 are also as previously described herein. Outer layers 34 and 36 are polyolefin layers.

Figure 4:
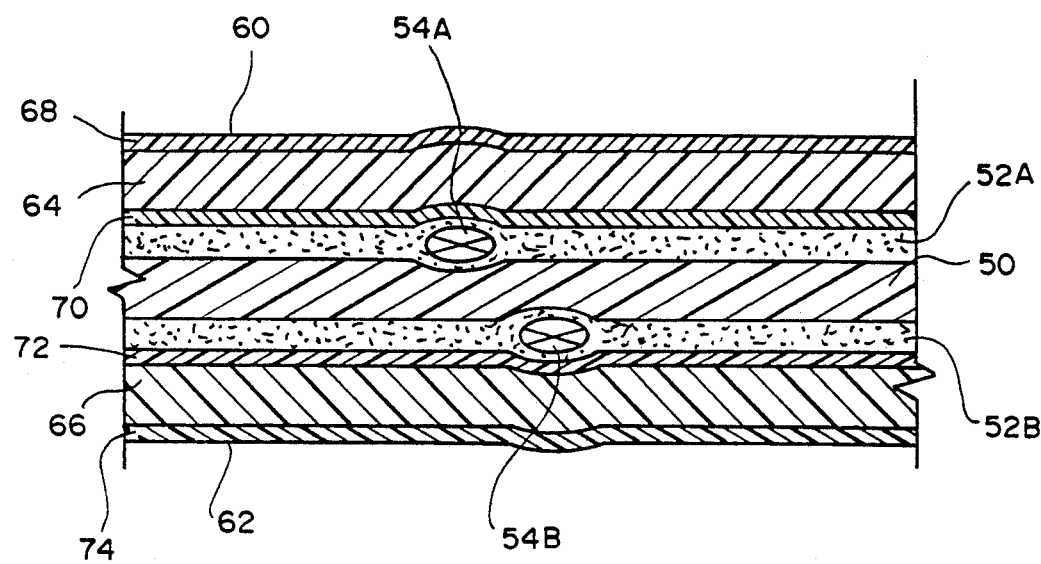
FIG. 4 is an enlarged cross-section of the multilayered reinforced shrink wrap with multiply outer layers.

FIG. 4 is another embodiment of the shrink wrap illustrating the use of multiply polyolefin layers. In FIG. 4 the inner layer 50 is shrink film as previously described in this specification. Layers 52a and 52b are adhesive layers and 54a and 54b are sections of filamentous grid which have been discussed above. The outer polyolefin layers 60 and 62 are shown as multiply film with three co-extruded plies. The three ply film is for exemplary purpose only because the polyolefin layers can be two or more plies thick depending on the intended use.

In FIG. 4 polyolefin layers 60 and 62 have middle plies 64 and 66 respectively. Each of the middle plies 64 and 66 have an outer layer of polyolefin on either side shown as plies 68 and 70 for inner ply 64 and 72 and 74 for inner ply 66. In a preferred embodiment the middle ply is about 50% to 70% of the total thickness. The multiply film can be made by co-extrusion and other processes known to those skilled in the art.

The multiply olefin film will allow the preparation of a single film with varied characteristics for each ply. For instance, an additive that may be more effective on an outer surface, such as a corrosion inhibitor, can be added to the outer ply material prior to fabrication such that only one ply will contain the additive. Similarly the polyolefin content can be varied for each ply so that the outer layer ply has a polyolefin content with better surface characteristics and the inner ply is formulated for strength and durability characteristics.

Figure 3:
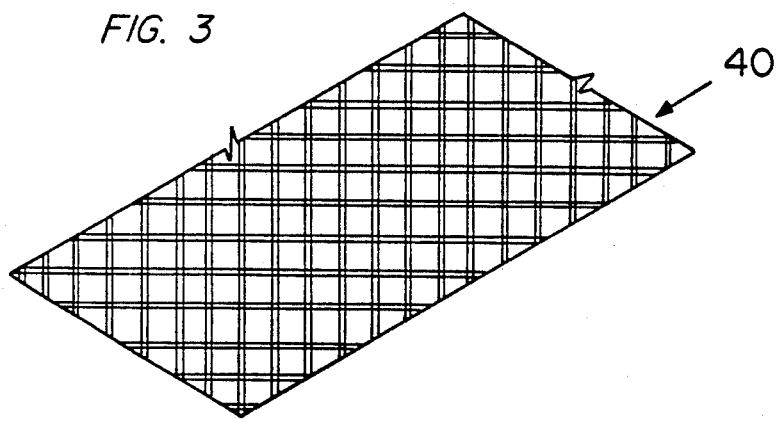
FIG. 3 is a view of a sheet of the shrink wrap showing the reinforcing grids.

FIG. 3 is a portion 40 of a sheet or roll of the reinforced shrink wrap of this invention. Covers for products, crates or packaging can be made by any method of cutting and seaming for large equipment and machinery. The covers can be constructed with sewn seams, heat sealed, hot melt, radio or ultrasonic waves or any other available method known to those skilled in the art. The reinforced shrink wrap can also be used for small items and it is not the intent to limit in any way the size or shape of cover that can be made and used.

The cover is placed around the package or product and heat is applied by hot air blowers, ovens or any other means. The shrink film deforms and conforms to the shape and size of the item covered and the other layers of the wrap of this invention will also deform to provide a snug reinforced, strong cover for the item. The shrink wrap of this invention is resistant to burn through when localized heat is used to shrink the cover. The reinforced shrink wrap of this invention has a minimum shrink of 4.5%. Equipment that will be exposed to the environment including corrosive elements such as salt air from shipment on the decks of ships can be protected. Additives known to those skilled in the art can be added to the polyolefin layers to provide protection from corrosion, ultraviolet light, static, fire and any other deleterious conditions that may be encountered.

Variations other than those described specifically herein will be apparent to those skilled in the art. It is not the intent to limit the claims of this invention to any particular embodiment.

What is claimed is:

1. A multilayered laminated reinforced shrink wrap comprising
    at least one layer of shrink film of highly irradiated polyethylene;
    reinforcing filamentous grids on either side of the shrink film;
    said reinforcing filamentous grids embedded in a flexible adhesive layer; and
    two polyolefin film layers adhered to said adhesive layers as the outer surface of the shrink wrap.

2. A reinforced shrink wrap of claim 1 wherein the reinforcing filamentous grid material is selected from the group consisting of nylon filament and polyester filament wherein said filament having from 200 to 800 denier.

3. A reinforced shrink wrap of claim 1 wherein said adhesive layer is selected from the group of water based, solvent-based and pressure sensitive adhesives and said adhesive layer is from 0.25 mil to 1 mil thickness when dry.

4. A reinforced shrink wrap of claim 1 wherein said polyolefin film layers are from 1 mil to 6 mils thick.

5. A reinforced shrink wrap of claim 1 wherein at least one of said polyolefin film layers includes an ultraviolet light stabilizer.

6. A reinforced shrink wrap of claim 1 wherein at least one of said polyolefin film layers includes a flame retardant.

7. A reinforced shrink wrap of claim 1 wherein at least one of said polyolefin film layers includes a static inhibitor.

8. A reinforced shrink wrap of claim 1 wherein at least one of said polyolefin film layers contains a color additive.

9. A reinforced shrink wrap of claim 1 wherein at least one of said polyolefin film layers has an effective amount antioxidant.

10. A reinforced shrink wrap of claim 1 wherein at least one of said polyolefin film layers includes a corrosion inhibitor.

11. A reinforced shrink wrap of claim 1 wherein at least one of said polyolefin film layers includes a biocide.

12. A reinforced shrink wrap of claim 1 wherein at least one of said outer surface polyolefin film layers is a multiply film.

13. A reinforced shrink wrap of claim 12 wherein at least one ply of said multiply polyolefin layer contains an additive selected from the group consisting of ultraviolet stabilizer, flame retardant, static inhibitor, color additive, antioxidant, corrosion inhibitor, biocide and mixtures thereof.

14. A product cover made of the reinforced shrink film of claim 1.

15. A multilayered laminated reinforced shrink wrap comprising
    at least one layer of shrink film highly irradiated polyethylene selected from the group consisting of linear low density polyethylene, low density polyethylene and blends thereof of between 0.75 to 1.5 mils in thickness;
    a nylon yarn reinforcing filament in a crisscross grid pattern on either side of each layer of highly irradiated polyethylene;
    said nylon yarn reinforcing filament embedded in a layer of acrylic adhesive in an aqueous carrier; and
    polyolefin film layers adhered to said adhesive layer as the outer surface of the shrink wrap.

16. A reinforced shrink wrap of claim 15 wherein there are two layers of shrink film; and
    three layers of nylon yarn reinforcing filament and adhesive.

17. A multilayered laminated reinforced shrink wrap of claim 15 wherein at least one of said outer surface polyolefin film layers is a multiply film.

18. A product cover made of the reinforced shrink film of claim 15.

19. A reinforced shrink wrap comprising at least one layer of shrink film of highly irradiated polyethylene;

reinforcing filamentous grids on either side of the shrink wrap;

said reinforcing filamentous grids embedded in a flexible adhesive layer;

at least one inner layer of polyolefin film having a first surface adhered to said flexible adhesive layer;

an adhesive layer adhered to a second surface of each of said inner layer of polyolefin film; and two polyolefin film layers adhered to said adhesive layer and composing the outer surfaces of the shrink wrap.

20. A reinforced shrink wrap of claim 19 wherein at least one of said outer polyolefin film layers is a multiply film.

21. A reinforced shrink wrap of claim 20 wherein at least one ply of said multiply film contains an additive selected from the group consisting of ultraviolet stabilizer, flame retardant, static inhibitor, color additive, antioxidant, corrosion inhibitor, biocide and mixtures thereof.

22. A reinforced shrink wrap of claim 19 wherein at least one additional reinforcing filamentous grid is in said adhesive layers adjacent to said inner layer of polyolefin film.

23. A product cover made of the reinforced shrink wrap of claim 19.

* * * * *